(12) United States Patent
Chan et al.

(10) Patent No.: US 8,837,312 B2
(45) Date of Patent: Sep. 16, 2014

(54) SIGNATURE DETECTION AND TIMING OFFSET ESTIMATION

(75) Inventors: Wing Chau Chan, Hong Kong (CN); Jun Xu, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 34 days.

(21) Appl. No.: 13/408,864

(22) Filed: Feb. 29, 2012

(65) Prior Publication Data

US 2013/0223242 A1 Aug. 29, 2013

(51) Int. Cl.
*H04W 24/00* (2009.01)

(52) U.S. Cl.
USPC ........................................ 370/252

(58) Field of Classification Search
USPC ........................................ 370/252
See application file for complete search history.

(56) References Cited

U.S. PATENT DOCUMENTS

| | | | |
|---|---|---|---|
| 6,046,395 A * | 4/2000 | Gibson et al. | 84/603 |
| 2007/0211671 A1 * | 9/2007 | Cha | 370/335 |
| 2008/0310561 A1 | 12/2008 | Song et al. | |
| 2009/0213968 A1 | 8/2009 | Tormalehto | |
| 2009/0225908 A1 | 9/2009 | Masuda et al. | |
| 2009/0268787 A1 * | 10/2009 | Cairns et al. | 375/148 |
| 2010/0158050 A1 | 6/2010 | Yang | |
| 2010/0161699 A1 | 6/2010 | Kim et al. | |
| 2010/0312554 A1 * | 12/2010 | Pietsch et al. | 704/227 |
| 2011/0110240 A1 | 5/2011 | Bergquist et al. | |
| 2011/0143762 A1 | 6/2011 | Zhang et al. | |
| 2011/0170440 A1 | 7/2011 | Gaal et al. | |
| 2011/0188466 A1 | 8/2011 | Zhang et al. | |

FOREIGN PATENT DOCUMENTS

| | | |
|---|---|---|
| CN | 101295999 A | 10/2008 |
| CN | 101682602 A | 3/2010 |
| CN | 102223654 A | 10/2011 |

OTHER PUBLICATIONS

Office Action issued for Chinese Patent Application No. 201210070577.0 dated Apr. 1, 2014, 9 pages with English language translation.

* cited by examiner

*Primary Examiner* — Dang Ton
*Assistant Examiner* — Mewale Ambaye
(74) *Attorney, Agent, or Firm* — Fulbright & Jaworski LLP (57) ABSTRACT

Bias introduced by down-sampling may be eliminated, or significantly reduced, by the present embodiments. Methods and apparatuses are described for use in wireless communication systems including LTE and other mobile data systems. The method includes identifying a timing offset estimation bias caused by a misalignment between samples and a zero-offset point of a preamble signature.

21 Claims, 9 Drawing Sheets

SIGNATURE DETECTION AND TIMING OFFSET ESTIMATION

TECHNICAL FIELD

This invention relates to data communications and more particularly relates to signature detection and timing offset estimation.

BACKGROUND OF THE INVENTION

Figure 1:
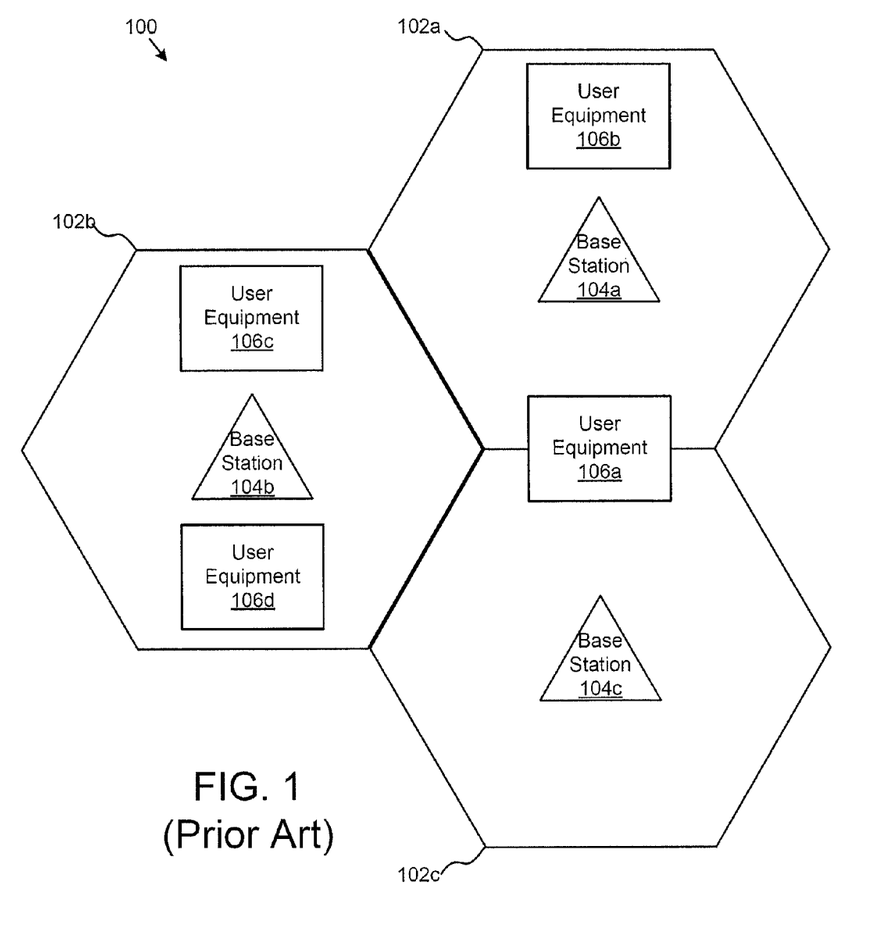
FIG. 1 is a schematic diagram illustrating a cellular network of the prior art.

FIG. 1 illustrates cellular network 100 of the prior art. Each cell 102a-c in cellular network 100 is generally defined by an area in which base stations 104a-c are able to communicate with User Equipment (UE) 106a-d. Examples of UEs 106a-d include telephones, smartphones, Personal Data Assistants (PDAs), tablet computers, cellular data devices for use with laptop computers, and the like. Generally, each cell 102a-c includes one corresponding base station 104a-c.

Any number of UEs 106a-d may be found in cells 102a-c, depending on the use habits of the users of cellular network 100. For example, cell 102b includes two UEs 106c-d. In such an embodiment, both UEs 106c-d may communicate with base station 104b at the same time. Depending on the protocol used by base station 104b, UEs 106c-d may communicate simultaneously, or substantially simultaneously. Alternatively, UEs 106c-d may communicate with base station 104b within a time slot. Additionally, UEs 106a-d may move between cells as the user travels from one area to another. As shown, UE 106a may move from cell 102a to cell 102c. In this sort of case, cell 102a includes two UEs 106a-b initially, but once UE 106a moves to cell 102c, cell 102a only includes UE 106b. Thus cellular networks 100 are generally dynamic in nature, and changes in the topology of cellular network 100 may be random, based upon the user's habits.

Figure 2:
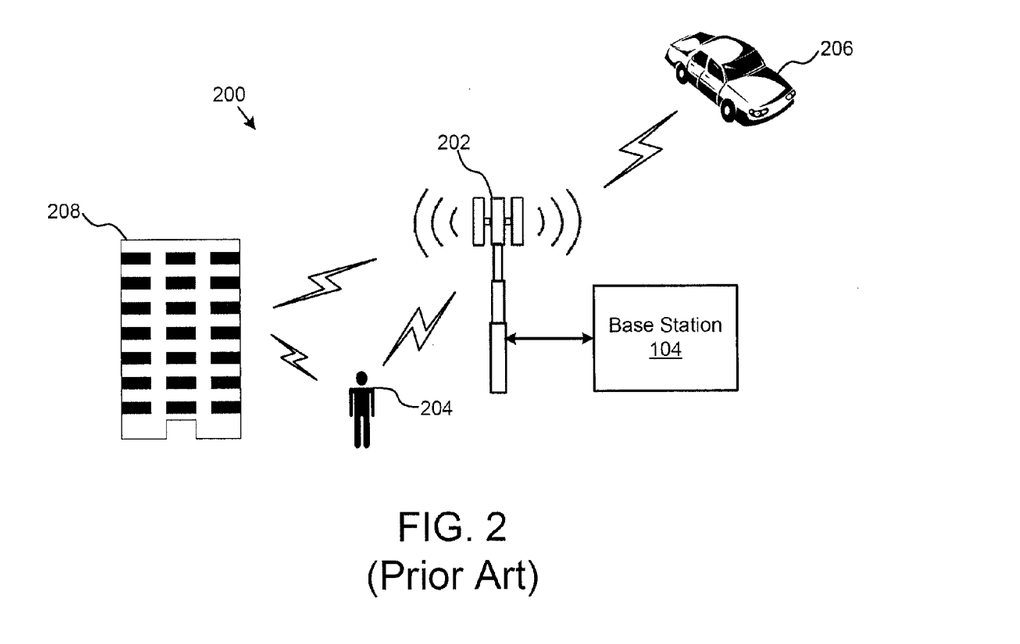
FIG. 2 is a schematic diagram illustrating a cellular network environment.

FIG. 2 illustrates an example of a topology for any of cells 102a-c. In addition to base station 104, cells 102 may include antenna 202 coupled to base station 104. Antenna 202 receives random access signals from UEs 106 operated by user 204 in a multipath environment and mobile user 206 over one or more Random Access Channels (RACHs) operated by base station 104. The RACH allows UEs 106 to gain initial access to cellular network 100 and facilitates uplink synchronization.

Figure 3:
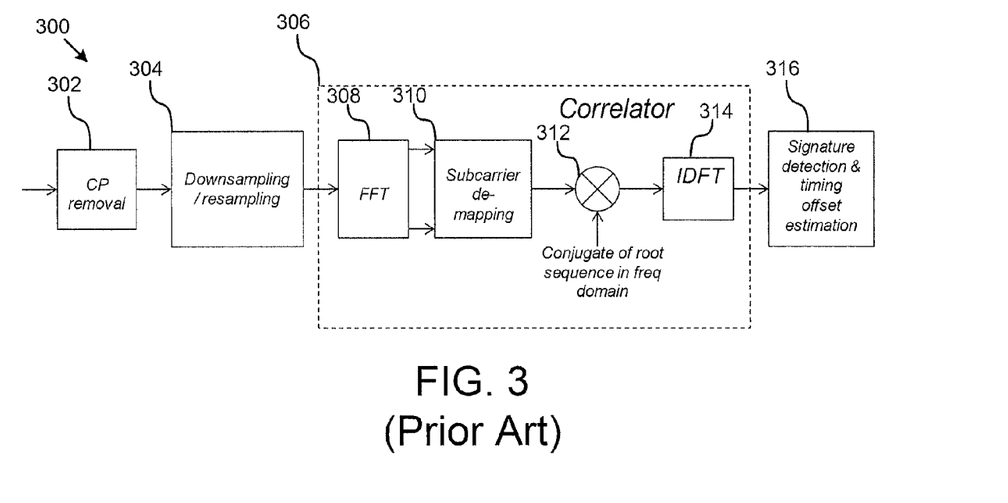
FIG. 3 is a schematic block diagram illustrating a random access channel circuit of the prior art.

FIG. 3 illustrates RACH detection circuit 300 according to the prior art. RACH detection circuit 300 is often included in base station 104. RACH detection circuit 300 includes CP removal module 302 for removing the Cyclic Prefix (CP) from received symbols. RACH detection circuit 300 also includes downsampling/resampling module 304 for reducing a sample rate to a frequency that is suitable for use by correlator 306. The reduced sample rate simplifies operations of the correlator 306, particularly in FFT module 308. Correlator 306 includes Fast Fourier Transform (FFT) module 308 configured to transform the downsampled symbol and subcarrier demapping module 310, correlator 306 also includes subcarrier demapping module 310 and multiplier 312. Multiplier 312 multiplies the demapped subcarrier with a conjugate of a root sequence in the frequency domain. The multiplied carrier is then converted back to time domain by Inverse Discrete Fourier Transform (IDFT) module 314. In prior systems 300, signature detection and timing offset estimation module 316 detects a random access signal from UE 106 and determines the timing offset of the detected random access signal.

In Long Term Evolution (LTE) mobile communication networks, for example, UEs 106a-d send random access signals to base stations 104a-c, when the UEs 106a-d are in respective cells 102a-c, to gain initial access to cellular network 100. The random access signals may be sampled by the base station at up to 24576 samples (~1 ms) in the time domain. One problem with the prior art is that it often takes very complex hardware to detect random access signals with high accuracy, particularly with respect to operations performed by FFT module 308.

Although some prior methods and devices do use all 24576 samples to perform random access detection, most systems use some form of down-sampling to reduce hardware complexity. Down-sampling typically involves dividing the number of samples by an integer, and then only selecting a reduced number of signal samples. For example, 2-fold down-sampling would use 12288 samples, and 4-fold down-sampling would only use 6144 samples. Although these down-sampling techniques may reduce hardware complexity, the tradeoff is a performance degradation due to a bias introduced at down-sampling for those specific access signals that do not fall directly on the samples.

BRIEF SUMMARY OF THE INVENTION

Bias introduced by down-sampling may be eliminated, or significantly reduced, by the present embodiments. Methods and apparatuses are described for use in wireless communication systems including LTE and other mobile data systems. The method includes identifying a timing offset estimation bias caused when a zero-offset point of a signature does not fall directly on a first sample of a detection interval. The difference between the first sample point of the detection interval and the zero-offset point may be compensated for in the timing offset estimation.

More specifically, when downsampling is used by a PRACH device in the base station, there may be a misalignment between the first samples of the detection intervals and the zero-offset points of each interval, because the samples may not fall directly on each zero-offset point, depending upon the rate of downsampling selected. The present embodiments describe methods for calculating the misalignment-induced bias, and then subtracting the misalignment-based bias from the timing offset estimation for each peak.

In one embodiment, the misalignment-based bias for each signature is calculated in advance of receiving a peak. For example, upon configuring the downsampling rate, the misalignment for each signature may be detected, and then a value representing the misalignment may be stored in a memory device for later use by a timing offset module. The timing offset module may use the value to subtract or otherwise compensate for the bias while estimating the timing offset for a received peak.

Additionally, the present embodiments describe methods for avoiding missed peak detections due to misalignment between detection interval and the zero-offset point for each preamble signature. To overcome missed peak detections, the present embodiments include methods for ensuring that the zero-offset point is always included in the detection interval.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 4:
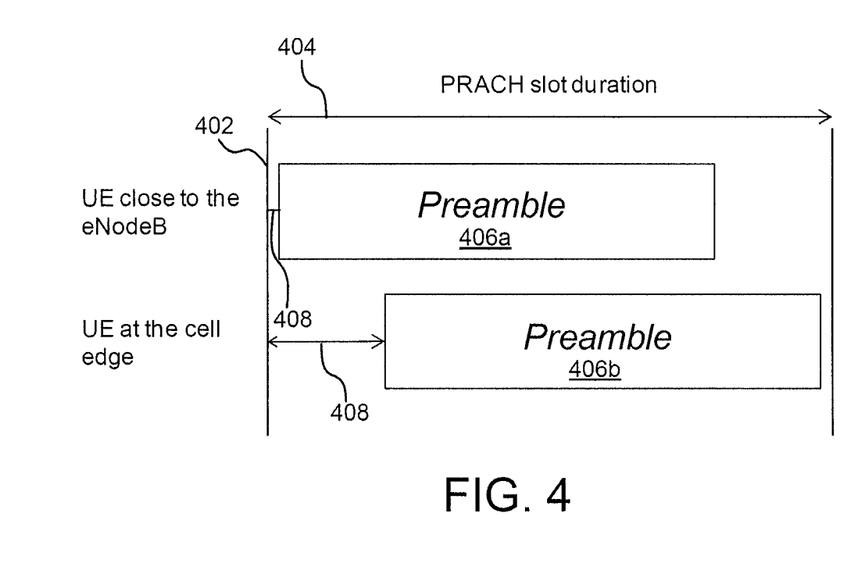
FIG. 4 is a conceptual drawing illustrating an embodiment of a PRACH communication time slot.

The present embodiments relate to improved methods for providing initial network access and uplink synchronization using PRACH. FIG. 4 is a conceptual drawing illustrating an embodiment of a PRACH communication time slot 402. PRACH uses sixty-four indexed preamble signatures per cell for initial network access and uplink synchronization between UEs 106 and base stations 104. For example, UE 106b may choose one out of the available preamble signatures and transmit a preamble signal 406a to base station 104a. Time slot 402 may correspond to the selected preamble signature. Base station 104a then detects the preamble index (0-63) and the timing offset 408 of preamble 406a.

In some embodiments, base station 104a may be referred to as eNodeB. If UE 106a is physically close to base station 104a (eNodeB), then the timing offset 408 may be small. If, on the other hand, UE 106b is located far away from base station 104a, then timing offset 408 may be relatively large. The overall duration 404 of PRACH slot 402 may be determined by the cell size.

Figure 5:
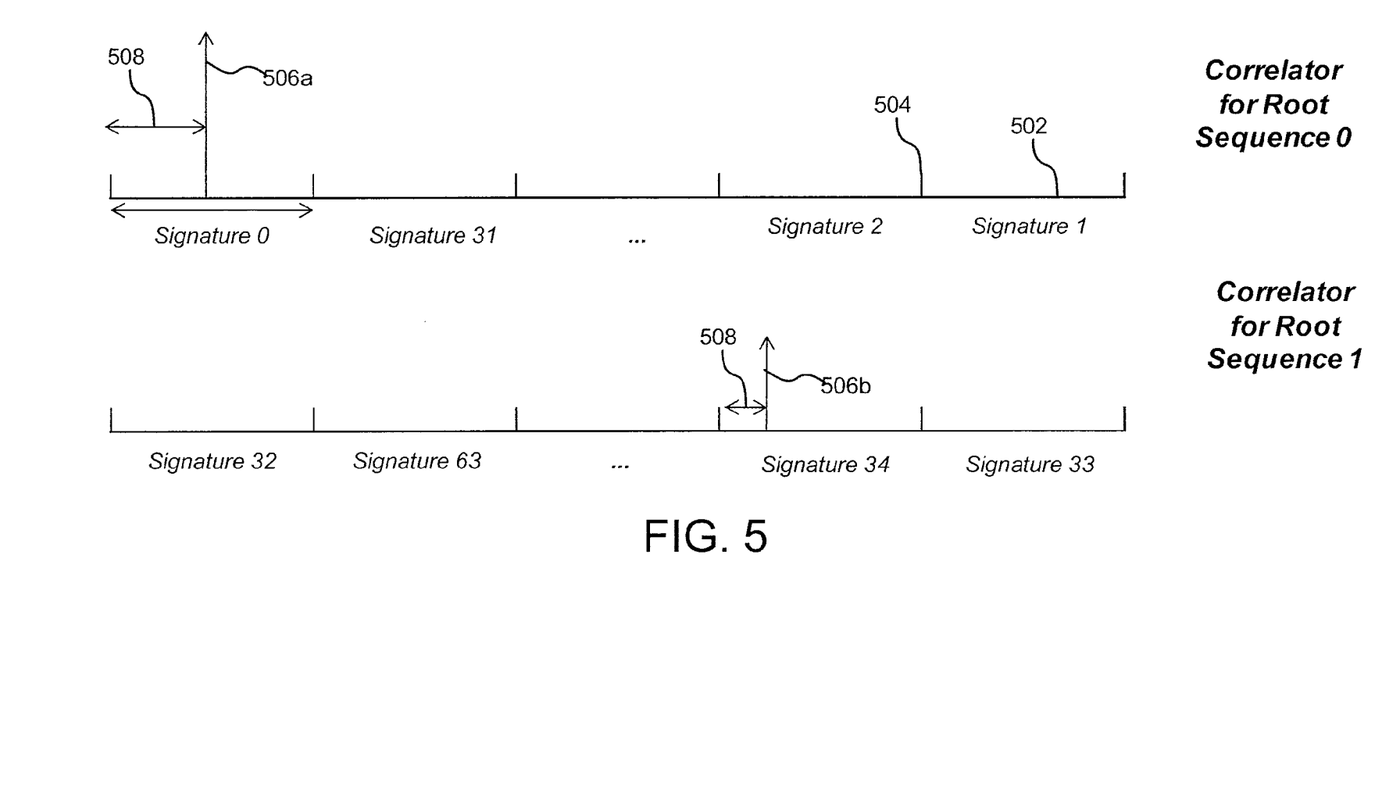
FIG. 5 is a conceptual drawing illustrating one embodiment of PRACH preamble signatures.

FIG. 5 is a conceptual drawing illustrating one embodiment of a set of PRACH preamble signatures 502. As described above, LTE networks include sixty-four signatures (0-63). The preamble signatures 502 may be constructed from cyclic shifts of one or more root sequences. For example, a Zadoff-Chu (ZC) sequence may be used. ZC sequences may have Constant Amplitude Zero AutoCorrelation (CAZAC) properties and good cross-correlation. In the embodiment described in FIG. 5, the PRACH includes two root sequences, which are used by the correlator 306 to generate signatures 0-31 and 32-63, respectively. Each signature 502 has a zero-offset point 504, which defines a boundary of the signature 502.

When a random access signal is received from UE 106 by base station 104, correlator 306 may determine the index number of the signature 502. Additionally, the correlator 306 may estimate the timing offset 508 of the received signal. As shown in FIG. 5, the random access signal is represented by a peak 506a-b. The timing offset 508 is estimated based on the distance of peak 506a-b from the zero-offset point 504 for the respective signatures 502.

Figure 6:
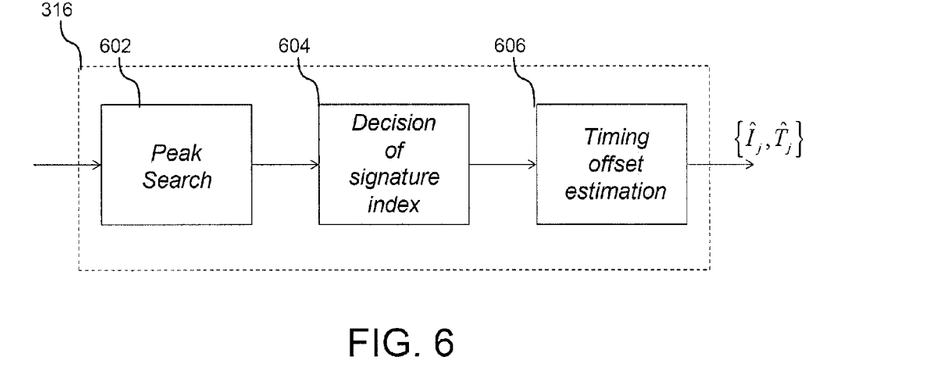
FIG. 6 is a schematic block diagram illustrating one embodiment of a signature detection and timing offset estimation module.

FIG. 6 is a schematic block diagram illustrating one embodiment of a signature detection and timing offset estimation module 316. In one embodiment, the signature detection and timing offset estimation module 316 includes a peak search module 602, a decision of signature index module 604 and a timing offset estimation module 606. In one embodiment, these modules 602-606 are configured to perform signal detection and timing offset estimation according to processing rules discussed in further detail with respect to FIGS. 8-9.

Peak search module 602 may use one or more threshold values to filter peaks and identify a set of peaks 506 having predetermined characteristics. For example, peak search module 602 may apply an amplitude threshold to exclude all peaks 506 having an amplitude below a predetermined threshold level. In another embodiment, search windowing may be applied to eliminate power leakage peaks and other peaks deemed to be false according to a set of predetermined criteria. Peak search module 602 may then pass peak 506 to decision of signature index module 604.

Decision of signature index module 604 may determine which signature index (e.g., 0-63) corresponds to characteristics of peak 506. For example, as illustrated in FIG. 5, decision of signature index module 604 may determine that peak 506a is received on preamble signature 0 and that peak 506b is received on preamble signature 34 based upon frequency characteristics or timing characteristics of peaks 506a-b. As described, peaks 506a-b may be assigned to different signature indexes because they may be received from different UEs 106a-d.

Figure 7:
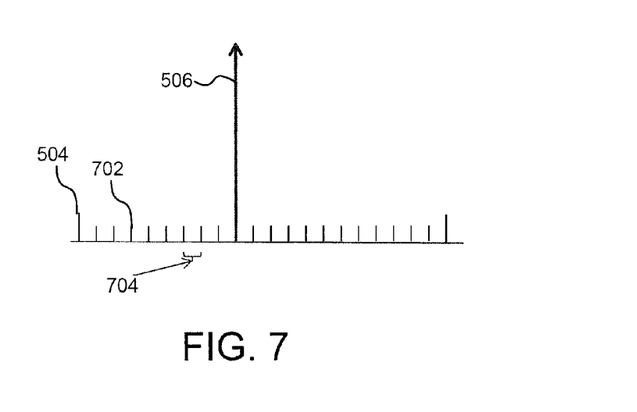
FIG. 7 is a conceptual diagram illustrating the resolution of timing offset.

Once the signature index is decided, then timing offset estimation module 606 may determine a timing offset of peak 506 with respect to zero-offset point 504. As shown in FIG. 7, each signature may be sampled at a predetermined rate by the IFFT 308 and/or IDFT 314 in correlator 306. The time between each sample 702 may be a predetermined time period 704. Timing offset estimation module 606 may determine the timing offset based upon the number of samples between zero-offset point 504 and peak 506.

Figure 8:
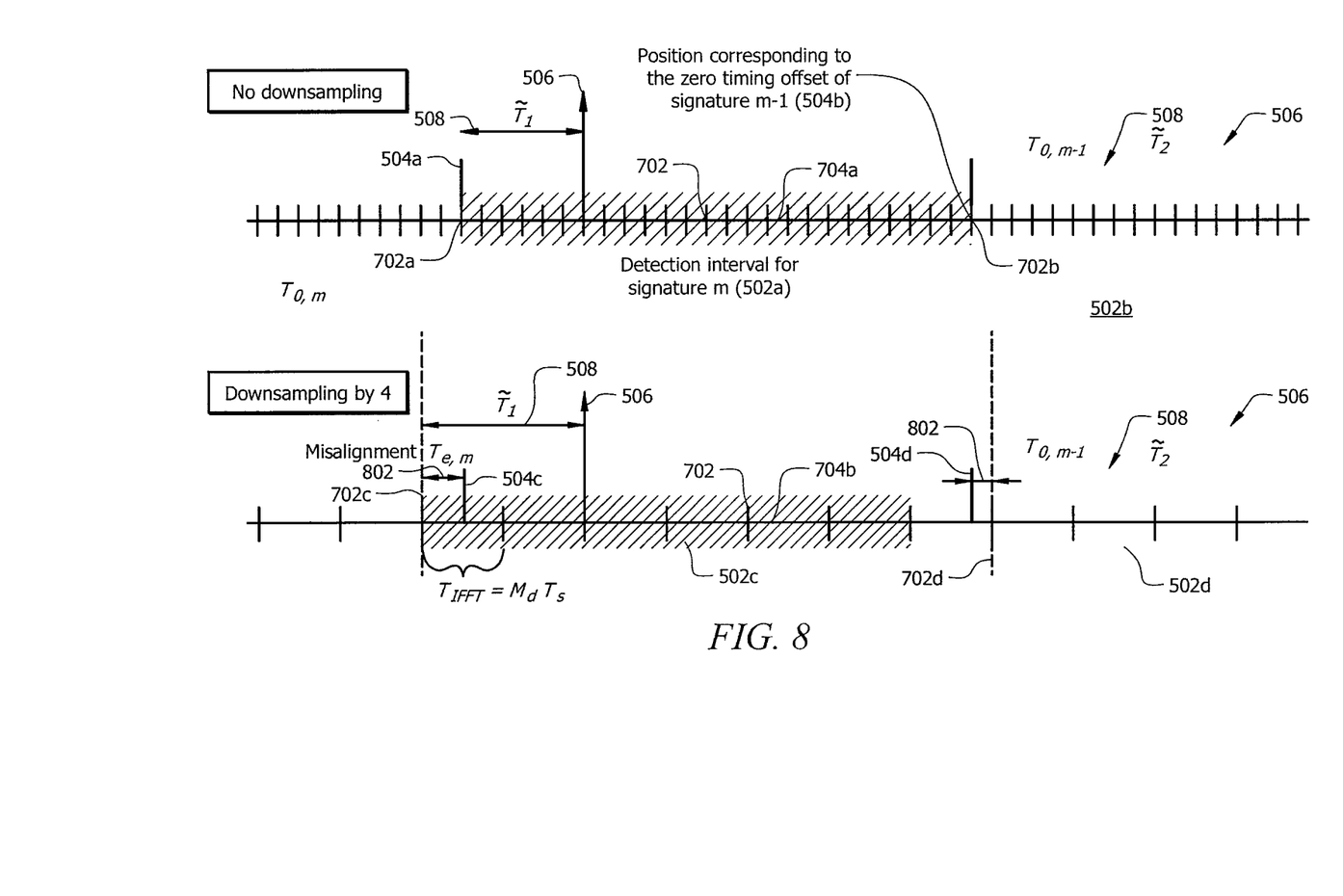
FIG. 8 is a conceptual diagram illustrating misalignment of zero-offset points.

Such methods of timing offset estimation may be a source of estimation error when downsampling is used. As illustrated in FIG. 8, each detection interval 502a-d for each signature (m and m−1) includes multiple samples 702, each having time period 704 that corresponds to the sampling rate. Where no downsampling is used, time period 704a may be smaller than time period 704b of corresponding downsampled signature 502c-d. Depending on the downsampling rate used, there may be some misalignment 802 between first sample 702c, d and zero-offset point 504c, d of each signature. For example, as shown in signature 502c sample 702c falls to the left of zero-offset point 504c. Misalignment 802 may be quantified as the distance between sample 702c and zero-offset point 504c. In another example, first sample 702d of signature 502d falls to the right of zero-offset point 504d, so the misalignment 802 may occur on either side of zero-offset point 504. If the misalignment 802 is large, and it occurs on the right side, peaks 506 which are close to zero correlation point 504 may be missed altogether. Thus, downsampling may cause missed peaks 506 and cause errors in estimating timing offset 508.

Figure 9:
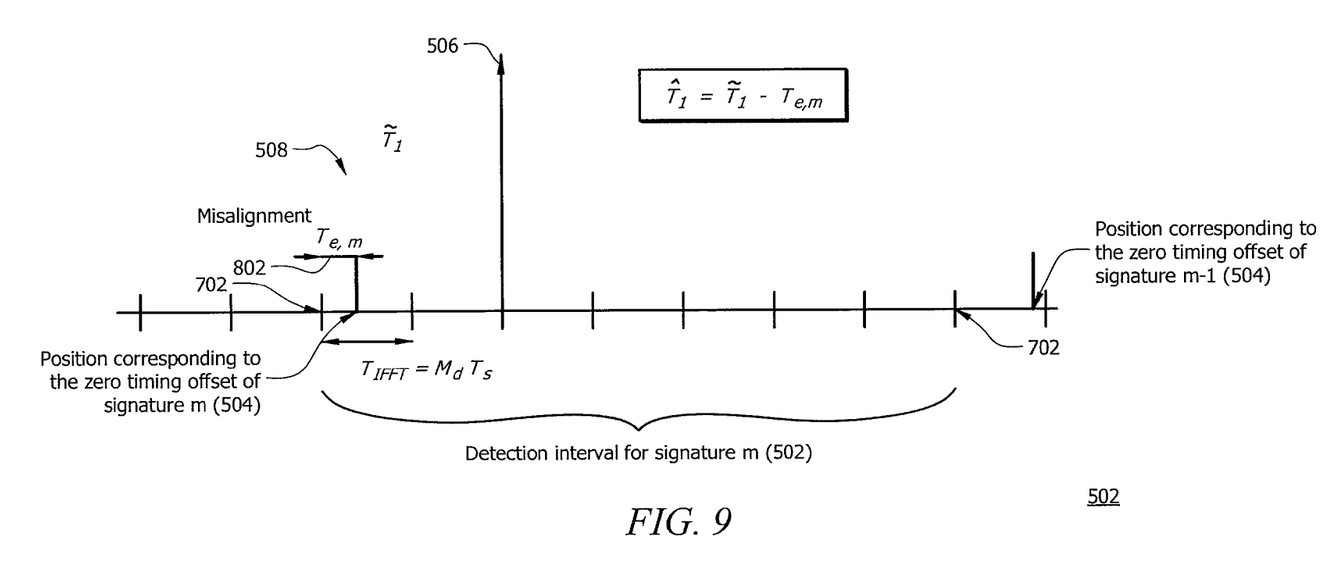
FIG. 9 is a conceptual drawing illustrating one embodiment of a method for correcting bias from downsampling a preamble signature.

FIG. 9 is a conceptual drawing illustrating one embodiment of a method for correcting bias from downsampling a preamble signature. Parameters for use in signature detection and timing offset estimation module 316 may be configured according to the embodiments described in FIG. 9. In one embodiment, the method includes removing a timing bias for each signature 502 by subtracting misalignment 802 from the estimation of time offset 508. In one embodiment, misalignment 802 may be subtracted from the estimation of time offset 508 if the sample 702 falls to the left of zero-offset point 504. Misalignment 802 may be added to the estimation of time offset 508 if sample 702 falls to the right of zero-offset point 504.

In one embodiment, signature detection and timing offset estimation module 316 may be configured to always select detection interval 502 that includes zero-offset point 504. Such an embodiment may help avoid situations where peaks 506 are lost due to misalignment. Additionally, this may simplify the process for correcting bias from misalignment 802, because the calculation will always include a subtraction.

In one embodiment, signature detection and timing offset estimation module 316 may be configured to pre-compute timing offset biases caused by misalignment 802. For example, when the downsampling rate is selected, misalignment 802 for each preamble signature 502 may be determined, and a value representing misalignment 802 may be stored in a memory device associated with base station 104.

Figure 10:
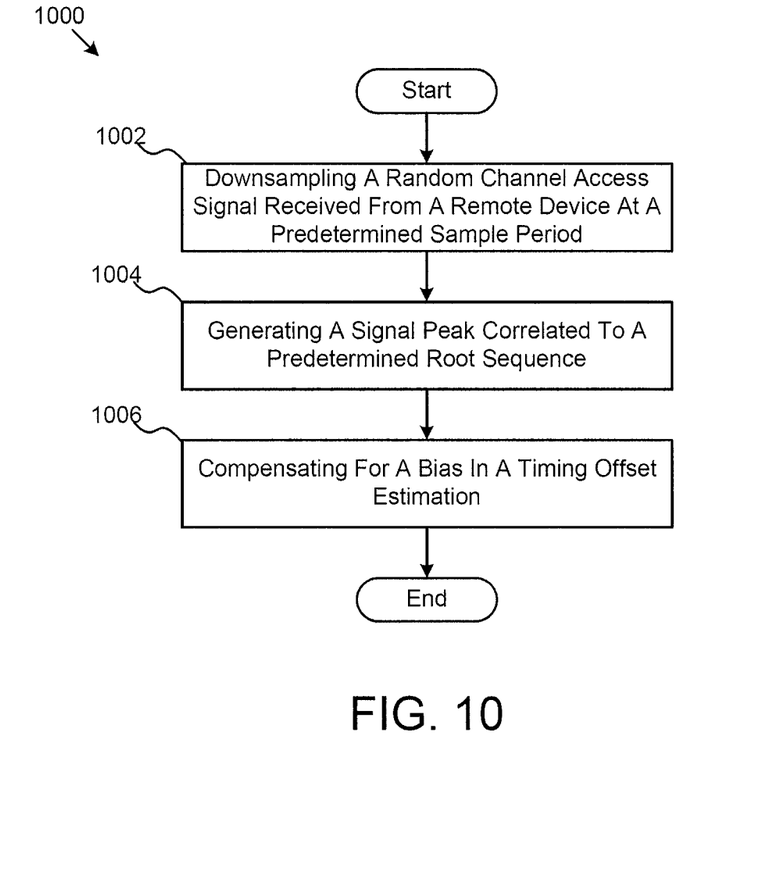
FIG. 10 is a schematic flowchart diagram illustrating one embodiment of a method for signature detection with timing offset bias compensation.

FIG. 10 is a schematic flowchart diagram illustrating one embodiment of method 1000 for signature detection with timing offset bias compensation. In one embodiment, downsampling module 304 downsamples a random channel access signal received from UE 106 at a predetermined sample period, as shown in block 1002. Then at block 1004, correlator 306 may generate one or more signal peaks correlated to a predetermined root sequence. Signature detection and timing offset estimation module 316 may then compensate for a bias in a timing offset estimation, the bias being a result of misalignment 802 between the sample period and a zero-offset point 504 in a random channel signature 502 as shown in block 1006. For example, signature detection and timing offset estimation module 316 may calculate a value representing misalignment 802 and subtract that value from the estimation of timing offset 508. In a further embodiment, signature detection and timing offset estimation module 316 may be configured to selected detection interval 502 such that detection interval 502 always includes zero-offset point 504.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for signature detection with timing offset bias compensation comprising:
   downsampling a random channel access signal received from a remote device at a predetermined sample period;
   generating a signal peak correlated to a random channel signature in a plurality of random channel signatures, the plurality of random channel signatures generated by cyclic-shifts of one or more predetermined root sequences; and
   compensating for a bias in a timing offset estimation, the bias being a result of a misalignment between the sample period and a zero-offset point in the random channel signature, said misalignment resulting from said downsampling a random channel access signal, wherein the compensating for a bias includes using a set of signature-specific pre-computed misalignment values, each misalignment value in the set of signature-specific pre-computed misalignment values corresponding to a misalignment value calculated for each signature in the plurality of random channel signatures before the generating a signal peak.

2. The method of claim 1, wherein at least one misalignment value in the set of signature-specific pre-computed misalignment values is generated by a joint function of a quantization of the misalignment between the sample period and the zero-offset point in the random channel signature, and a downsampling rate of the predetermined sample period.

3. The method of claim 2, further comprising storing the set of signature-specific pre-computed misalignment values in a non-volatile memory device for subsequent retrieval and use for compensating for the bias in the timing offset estimation.

4. The method of claim 2, where compensating for the bias in the timing offset estimation further comprises subtracting the misalignment value in the set of signature-specific pre-computed misalignment values corresponding to the correlated random channel signature from the timing offset estimation.

5. The method of claim 4, wherein the misalignment value corresponding to the correlated random channel signature is a positive value if the sample falls on a first side of the zero-offset point, and the value is a negative value if the sample falls on a second side of the zero-offset point.

6. The method of claim 1, further comprising selecting a detection interval that includes the zero-offset point.

7. An apparatus for signature detection with timing offset bias compensation comprising:
   a downsampling module configured to downsample a random channel access signal received from a remote device at a predetermined sample period;
   a peak detection module configured to generate a signal peak correlated to a random channel signature in a plurality of random channel signatures, the plurality of random channel signatures generated by cyclic-shifts of one or more predetermined root sequences; and
   a timing offset estimation module configured to compensate for a bias in a timing offset estimation, the bias being a result of a misalignment between the sample period and a zero-offset point in a random channel signature, said misalignment resulting from said downsample of a random channel access signal, wherein the compensation for the bias includes using a set of signature-specific pre-computed misalignment values, each misalignment value in the set of signature-specific pre-computed misalignment values corresponding to a misalignment value calculated for each signature in the plurality of random channel signatures before the peak detection.

8. The apparatus of claim 7, wherein at least one misalignment value in the set of signature-specific pre-computed misalignment values is generated by a joint function of a quantization of the misalignment between the sample period and the zero-offset point in the random channel signature, and a downsampling rate of the predetermined sample period.

9. The apparatus of claim 8, further comprising a non-volatile memory device for storing the set of signature-specific pre-computed misalignment values for subsequent retrieval and use for compensating for the bias in the timing offset estimation.

10. The apparatus of claim 8, wherein the timing offset estimation module is further configured to subtract the misalignment value corresponding to the correlated random channel signature from the timing offset estimation.

11. The apparatus of claim 10, wherein the misalignment value corresponding to the correlated random channel signature is a positive value if the sample falls on a first side of the zero-offset point, and the value is a negative value if the sample falls on a second side of the zero-offset point.

12. The apparatus of claim 7, wherein the timing offset estimation module further comprises a peak search module configured to select a detection interval that includes the zero-offset point and identify a peak within the detection window.

13. A tangible non-transitory computer-readable medium comprising instructions that, when executed by a processing device, cause the processing device to perform operations for signature detection with timing offset bias compensation comprising:
   downsampling a random channel access signal received from a remote device at a predetermined sample period;
   generating a signal peak correlated to a random channel signature in a plurality of random channel signatures, the plurality of random channel signatures generated by cyclic-shifts of one or more predetermined root sequences; and
   compensating for a bias in a timing offset estimation, the bias being a result of a misalignment between the sample period and a zero-offset point in a random channel signature, said misalignment resulting from said downsampling a random channel access signal, wherein the compensating for a bias includes using a set of signature-specific pre-computed misalignment values, each misalignment value in the set of signature-specific pre-computed misalignment values corresponding to a misalignment value calculated for each signature in the plurality of random channel signatures before the generating a signal peak.

14. The tangible medium of claim 13, wherein at least one misalignment value in the set of signature-specific pre-computed misalignment values is generated by a joint function of a quantization of the misalignment between the sample period and the zero-offset point in the random channel signature, and a downsampling rate of the predetermined sample period.

15. The tangible medium of claim 14, wherein the operations further comprise storing the set of signature-specific pre-computed misalignment values in a memory device for subsequent retrieval and use for compensating for the bias in the timing offset estimation.

16. The tangible medium of claim 14, where compensating for the bias in the timing offset estimation further comprises subtracting the misalignment value corresponding to the correlated random channel signature from the timing offset estimation.

17. The tangible medium of claim 16, wherein the misalignment value corresponding to the correlated random channel signature is a positive value if the sample falls on a first side of the zero-offset point, and the value is a negative value if the sample falls on a second side of the zero-offset point.

18. The tangible medium of claim 13, wherein the operations further comprise selecting a detection interval that includes the zero-offset point.

19. The method of claim 2 wherein the random channel access signal is received on a Long Term Evolution Physical Random Access Channel (LTE PRACH).

20. The apparatus of claim 8 wherein the random channel access signal is received on a Long Term Evolution Physical Random Access Channel (LTE PRACH).

21. The tangible medium of claim 14 wherein the random channel access signal is received on a Long Term Evolution Physical Random Access Channel (LTE PRACH).

* * * * *